July 19, 1949.
P. C. WHITE
2,476,788
METHOD FOR THE RECOVERY OF HYDROCARBON
SYNTHESIS PRODUCTS
Filed Sept. 28, 1945
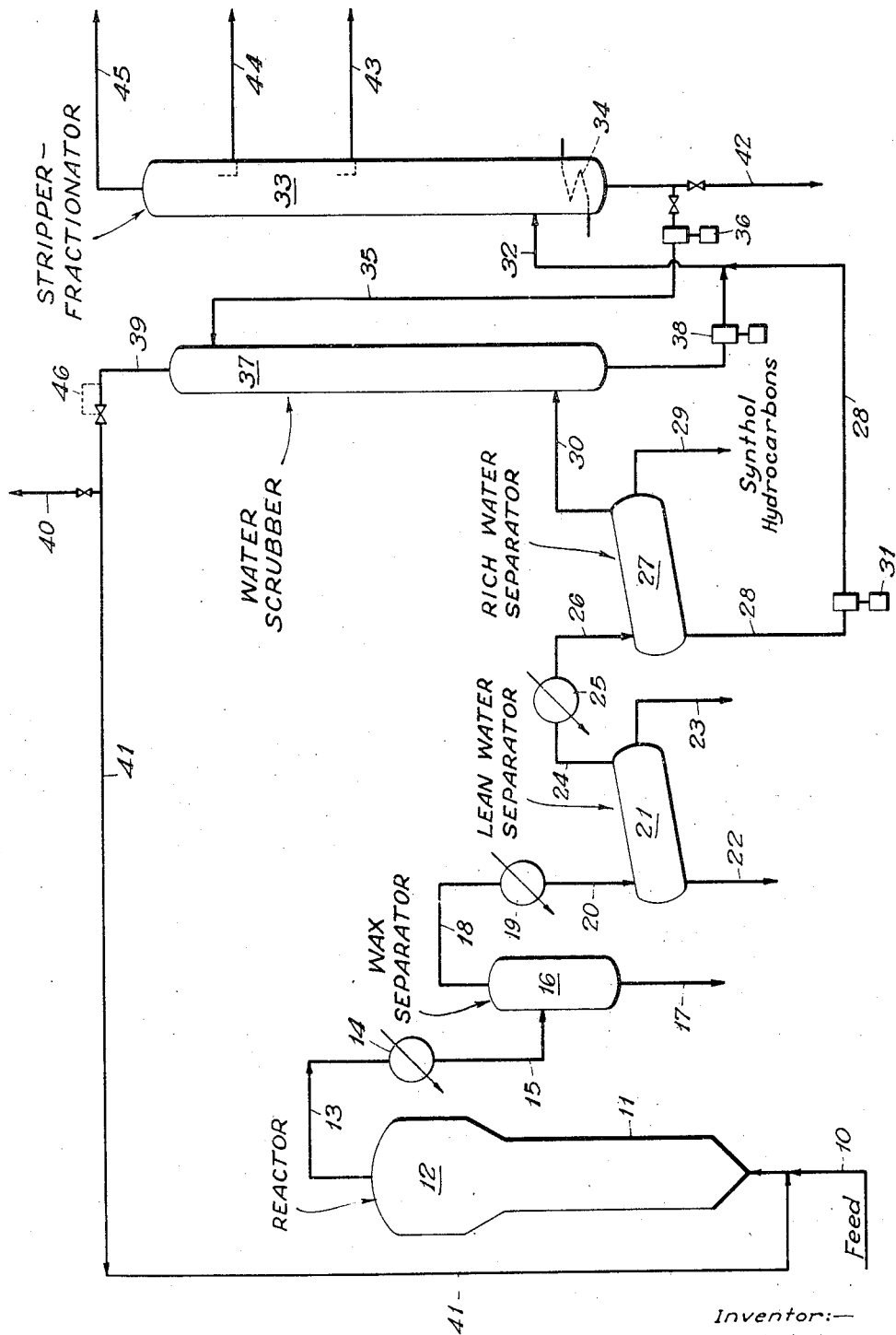
Inventor:—
Philip C. White
By Everett A. Johnson
Attorney Patented July 19, 1949

2,476,788

UNITED STATES PATENT OFFICE 2,476,788

METHOD FOR THE RECOVERY OF HYDROCARBON SYNTHESIS PRODUCTS

Philip C. White, Flossmoor, Ill., assignor to Standard Oil Company, Chicago, Ill., a corporation of Indiana Application September 28, 1945, Serial No. 619,245

7 Claims. (Cl. 260—450)

1

This invention relates to the production of useful liquid hydrocarbons and oxygenated hydrocarbon compounds from gases, and it pertains more particularly to an improved combination of synthesizing hydrocarbons and oxygenated compounds from mixtures of hydrogen and carbon monoxide and of separately recovering water soluble oxygenated compounds.

In the conversion of hydrogen and carbon monoxide with a synthesis catalyst to produce hydrocarbons having more than one carbon atom to the molecule it has been found that a substantial proportion of the synthesis product comprises oxygenated compounds and that substantially greater proportions of the product are oxygenated compounds when the iron type synthesis catalyst is employed. These oxygenated compounds appear in the hydrocarbon liquids, in the water condensed from the reaction system and in the gas streams beyond the liquid recovery.

A substantial proportion of the recoverable oxygenated compounds is found in the product water, the oxygenated compounds comprising between about 2 and about 20% or more of the total product water. These compounds have been identified as including among others formaldehyde, acetaldehyde, acetone, methyl ethyl ketone and methyl, ethyl, n-propyl, and n-butyl alcohols.

The oxygenated compounds in the product water and in the gas streams are the particular concern of this invention, and it is a primary object of this invention to effect optimum recovery of the oxygenated compounds. It is a further object of this invention to provide method and means for separately recovering concentrated fractions of oxygenated compounds while handling a minimum quantity of water. These and additional objects will become apparent in view of the detailed disclosure hereinafter.

The hydrocarbon synthesis may be effected by contacting a hydrogen-carbon monoxide mixture with a catalyst of the iron type at a temperature within the approximate range of about 450 and 650° F. under a pressure within the approximate range of between about 50 and about 500 pounds per square inch and at a space velocity within the approximate range of between about 100 and 2500 or more volumes of gas per volume of catalyst within the synthesis reactor. Thus space velocities of the order of 5000 are contemplated. The gas volumes are measured at 60° F. and at atmospheric pressure and the catalyst volume in the synthesis reactor is based on the fluidized catalyst.

In general the objects of this invention are

2 attained by fractional condensation of the hydrocarbon synthesis products, the products from the synthesis reaction zone being cooled in stages with separation of phases between the cooling stages, and the residual gas fraction is scrubbed for the removal of oxygenated compounds before recycle to the system. The product stream, after removal of waxes, can be cooled 20 to 100° F. below the boiling point of water at the partial pressure of water existing in the product stream following the wax knock-out trap. The mol fraction of the water in the effluent stream will be a function of the gas mixture used as feed, the conversion level, and the product distribution. Ordinarily the mol fraction of water will be in the range of between about 10 and 50 per cent.

The scrubbed residual gases which predominate in hydrogen, carbon monoxide, carbon dioxide and light hydrocarbons may be recycled to the hydrocarbon synthesis reactor or to the make gas preparation step. Optionally these gases can be sent to hydrocarbon recovery by means such as charcoal, oil or sulfuric acid absorbers or the like. Where air has been used in the preparation of the synthesis gas, the tail gases comprising substantial proportions of nitrogen should be vented. The liquid hydrocarbon products recovered may be fractionated as is well known in the art.

The invention will be more clearly understood from the following detailed description of a specific example which is to be read in conjunction with the accompanying diagrammatic flow sheet which forms a part of this specification.

A mixture of hydrogen and carbon monoxide in the approximate ratio of between 1:1 and 3:1 is supplied by line 10 to the synthesis reactor 11. This gas mixture can be produced, for example, from natural gas by methods well known in the art which include conversion or partial oxidation with air, steam, carbon dioxide or the like. The reactor may be of the fixed, moving bed, or fluid type and ordinarily will be provided with means for abstracting the heat of synthesis to maintain the synthesis temperature within a relatively narrow range.

In the drawing a reaction system of the so-called fluidized catalyst type is diagrammatically illustrated wherein a dense suspended turbulent or liquid-like catalyst phase is maintained within the reactor 11. In systems of this type catalyst solids of small particle size are fluidized by up-flowing gasiform materials within the reactor to produce a liquid-like dense phase therein.

Catalyst particles can be of the order of between about 2 and about 200 microns or larger, preferably 20 to 100 microns. With vertical gasiform fluid velocities of the order of about 0.5 to 5, preferably between about 1 and 4, for example, about 2 feet per second, a liquid-like dense phase of catalyst is obtained in which the bulk density within the reactor is between about 30 and about 90 per cent, preferably between about 40 and about 80, e. g., about 60 per cent of the density of the settled catalyst material.

It has been observed that the absolute density of the catalyst particles decreases with the on-stream time, and therefore it is contemplated that the vertical gasiform velocities can be diminished and/or the quantity of catalyst reduced to maintain the desired fluidized bulk density within the reactor. In any event the vertical velocity of the gasiform fluids is regulated so as to produce the turbulent suspension of catalyst material within the reactor.

The catalyst material is continuously settled from the reaction products within the enlarged zone 12 of the reactor 11. The residual catalyst in product line 13 can be removed by water scrubbing, cyclone separators, or the like. However, since the catalyst recovery system is not a feature of the present invention, further details have not been described.

In general, the reactor 11 can be operated under a pressure within the approximate range of between about 50 and about 500 pounds or more per square inch, for example, about 250 pounds per square inch, and at a temperature within the approximate range of between about 500 and 650° F., for example, about 600° F.

A suitable catalyst for the synthesis is preferably one or more Group VIII metals or metal oxides, for example, nickel, iron, or cobalt. A particularly useful catalyst is an iron-type catalyst similar to that used in ammonia synthesis. In some instances it is desirable to include promoters such as metals or metal compounds such as the oxides of aluminum, cerium, magnesium, manganese, thorium, titanium, uranium, zinc, zirconium, and the like. It is also contemplated that the catalyst can be supported on a suitable carrier such as clay, silica gel, alumina, Super Filtrol, Celite, etc.

Reverting to the flow diagram, the synthesis products and unreacted gases substantially free of catalyst are withdrawn via line 13 from the reactor 11 at a temperature of about 600° F. and under a pressure of about 250 pounds per square inch. An idealized product stream may, for example, be a mixture comprising about the following:

| | Mol per cent |
|---|---|
| $C_1$—$C_2$—$C_3$ | 7.0 |
| $C_4$—$C_5$—$C_6$ | 4.75 |
| $C_{7+}$—$C_{15}$ | .5 |
| Oxygenated compounds | .75 |
| $H_2O$ | 20.0 |
| $CO_2$ | 17.0 |
| $CO$ | 4.0 |
| $H_2$ | 30.0 |
| $N_2$ | 16.0 |
| | 100.0 |

The product stream in line 13 passes through partial condenser 14 wherein it is cooled to a temperature of about 450° F. and introduced into initial separator 16 via line 15. From the initial separator 16 heavy hydrocarbon products and waxes are withdrawn by line 17. The remainder of the gasiform product is withdrawn via line 18 from separator 16 and passed through partial condenser 19 which reduces the temperature to effect condensation of primarily product water.

In the product stream given in the above example, the water comprises about 19.4 mol per cent, and the partial condensation temperature for this stream is below about 285° F. This mixture can be cooled to a temperature about 20 to 100° F. below the boiling point of the water at the partial pressure of water existing in the product stream. The cooled material is introduced by line 20 into the intermediate separator 21 from which water and any carry-over catalyst is withdrawn via line 22 at a temperature of between about 185 and 265° F. and a pressure of between about 225 and 250 pounds per square inch. This water fraction is substantially free of any condensable oxygenated compounds.

A liquid hydrocarbon product stream is withdrawn from the separator 21 by line 23 and can be supplied to a suitable fractionation system. The gases withdrawn from the separator 21 by line 24 are passed through cooler 25 wherein the temperature is reduced to about 70° F. The cooled stream in line 26 is introduced into the final separator 27 from which a rich water fraction is withdrawn by line 28, a liquid hydrocarbon fraction is recovered by line 29 and a gaseous fraction by line 30.

If desired, the liquid hydrocarbon product fractions in lines 23 and 29 from separators 21 and 27, which include oil soluble oxygenated compounds, can be catalytically finished. For example, the product fraction can be heated to a temperature of between about 750 and 800° F. and contacted with a cracking catalyst to convert the oxygenated compounds to olefins. Such an operation does not effect any reforming or cracking, and the octane number improvement results from conversion of the oxygenated compounds. However, this catalytic finishing can be conducted at a higher temperature of the order of between 925° F. and about 975° F. which not only converts the oxygenated compounds to olefins but also effects reforming of the gasoline hydrocarbons and cracking of the heavier hydrocarbon product.

It is also contemplated that the oxygenated compounds in the hydrocarbon fractions can be separated by adsorption of the oxygenated compounds on silica gel from which they can be separated by steam distillation of the gel.

The rich product water fraction withdrawn via line 28 includes the major proportion of the condensable oxygenated compounds and is supplied via line 28, pump 31 and line 32 to a stripper-fractionator 33. The uncondensed gases in line 30 are scrubbed in a countercurrent water scrubber 37, and the tail gases in line 39 can be recycled to the synthesis reactor 11 via lines 41 and 10. These gases are rich in hydrogen and low molecular weight hydrocarbons, and if desired, these gases can be passed through a charcoal absorber before being recycled or vented from the system via line 40 for example.

Lean water from the stripper-fractionator 33 can be withdrawn from the system via line 42 and a portion can be supplied by line 35 and pump 36 as the scrubber medium in scrubber 37. Rich water from the scrubber 37 can be combined via pump 38 and line 32 with the rich water fraction in line 28 from the separator 27 and the oxygenated compounds stripped therefrom in stripper-fractionator 33. Oxygenated compounds will comprise between about 20 and 70 per cent of the aqueous phase introduced into the stripper-fractionator 33. A heat source 34 is provided near the base of the stripper-fractionator 33, and the oxygenated compounds can be separated by fractionation illustrated diagrammatically as streams 43, 44, and 45 in the upper portion of fractionator system 33. It is contemplated, however, that a separate fractionation system can be provided.

In one example the final separator was operated at about 50° F. and 300 pounds per square inch. The intermediate receiver 21 was maintained at a temperature of about 180° F. The mol fraction of the water in the stream entering 21 was 0.09 giving a partial pressure of water of 28 p. s. i. and a dew point of about 245° F. The aqueous layer from the intermediate receiver contained about 85% water and 15% oxygenated compounds. About 75% of the total product water was withdrawn from the intermediate receiver 21. The aqueous layer from the final separator 27 analyzed about 75% oxygenated compounds. A more nearly pure water fraction at the intermediate condenser 21 is obtainable by operating at a higher temperature of about 200° F., but then only about 60% of the total water would be recovered there.

Although fractionation has been described as the means of recovering the oxygenated compounds present in the aqueous phase from separator 27 and scrubber 37, it is to be understood that other means can be employed. The stream of oxygenated compounds and water in lines 28 and 32 can be treated by any method to recover the separate components as desired. Instead of steam stripping as a means of recovery of the oxygenated compounds in the aqueous phases, other means may be used such as extraction with a suitable solvent or conversion of the alcohols present to the more volatile aldehydes and ketones and subsequent recovery of all aldehydes and ketones present by stripping or by the addition of sodium bisulfite to precipitate the compounds formed with regeneration of the aldehydes and ketones by the addition of acid. Constant boiling mixtures with water may be formed and the azeotropes can be recovered as such.

From the above description it will be apparent that my invention provides a novel method and means for the recovery of products from a hydrocarbon synthesis and the efficient concentration of the water soluble oxygenated compounds.

It is to be understood that although my invention has been described with reference to an illustrative example, the invention is not restricted thereto. Modifications by those skilled in the art are contemplated without departing from the spirit of the invention defined by the appended claims.

What I claim is:

1. In a process for producing normally liquid products predominating in hydrocarbons and containing organic oxygenated compounds by catalytically hydrogenating carbon monoxide in the presence of an alkali-promoted iron catalyst, the improvement which comprises cooling vaporous reaction product from said hydrogenation to an elevated temperature within the range of about 20 to 100° F. below the boiling point of water at the partial pressure of water existing in said vaporous reaction product prior to said coolings, whereby partial condensation of water and normally liquid hydrocarbons and organic oxygenated compounds is effected; stratifying the resulting condensate; and withdrawing from said condensate at an elevated temperature within said range an aqueous phase containing not more than a minor proportion of the organic oxygenated compounds produced.

2. In a process for producing normally liquid products predominating in hydrocarbons and containing organic oxygenated compounds by catalytically hydrogenating carbon monoxide in the presence of an alkali-promoted iron catalyst, the improvement which comprises cooling the vaporous reaction product from said hydrogenation to a temperature between about 185 and 265° F. at a pressure sufficient to effect partial condensation of water and normally liquid hydrocarbons and organic oxygenated compounds therefrom; stratifying the resulting condensate; and withdrawing from said condensate at a temperature between about 185 and 265° F. an aqueous phase containing not more than a minor proportion of the organic oxygenated compounds produced.

3. In a process for producing normally liquid products predominating in hydrocarbons and containing organic oxygenated compounds by catalytically hydrogenating carbon monoxide in the presence of an alkali-promoted iron catalyst, the improvement which comprises partially condensing the vaporous reaction product from said hydrogenation at a temperature between about 185 and 265° F. and a pressure between about 50 and 500 pounds per square inch; stratifying the resulting condensate; and withdrawing from said condensate at a temperature between about 185 and 265° F. an aqueous phase containing not more than a minor proportion of the organic oxygenated compounds produced.

4. In a process for producing normally liquid products predominating in hydrocarbons and containing organic oxygenated compounds by catalytically hydrogenating carbon monoxide in the presence of an alkali-promoted iron catalyst, the improvement which comprises cooling vaporous reaction product from said hydrogenation to a temperature sufficiently low to effect condensation of high-boiling constituents thereof condensing at a temperature above the condensation point of water in said vaporous reaction product; separating and withdrawing said high-boiling constituents; further cooling the uncondensed vaporous reaction product to an elevated temperature within the range of about 20 to 100° F. below the boiling point of water at the partial pressure of water existing in said uncondensed vaporous reaction product after the separation of the high-boiling constituents, whereby partial condensation of water and normally liquid hydrocarbons and organic oxygenated compounds is effected; stratifying the resulting condensate; and withdrawing from said condensate at an elevated temperature within said range an aqueous phase containing not more than a minor proportion of the organic oxygenated compounds produced.

5. In a process for producing normally liquid products predominating in hydrocarbons and containing organic oxygenated compounds by catalytically hydrogenating carbon monoxide in the presence of an alkali-promoted iron catalyst, the improvement which comprises cooling the vaporous reaction product from said hydrogenation to a temperature below about 450° F. at a pressure between about 50 and 500 pounds per square inch to effect condensation of high-boiling constituents thereof condensing at a temperature below the condensation point of water in said vaporous reaction product; separating and withdrawing said high-boiling constituents; further cooling the uncondensed vaporous reaction product to an elevated temperature between about 20 and 100° F. below the boiling point of water at the partial pressure of water existing in said uncondensed vaporous reaction product after the separation of the high-boiling constituents, whereby partial condensation of water and normally liquid hydrocarbons and organic oxygenated compounds is effected; stratifying the resulting condensate; and withdrawing from said condensate at said elevated temperature an aqueous phase containing not more than a minor proportion of the organic oxygenated compounds produced.

6. In a process for producing normally liquid products predominating in hydrocarbons and containing organic oxygenated compounds by catalytically hydrogenating carbon monoxide in the presence of an alkali-promoted iron catalyst, the improvement which comprises cooling vaporous reaction product from said hydrogenation to an elevated temperature within the range of about 20 to 100° F. below the boiling point of water at the partial pressure of water existing in said vaporous reaction product prior to said cooling, whereby partial condensation of water and normally liquid hydrocarbons and organic oxygenated compounds is effected; stratifying the resulting condensate; withdrawing from said condensate at an elevated temperature within said range an aqueous phase containing not more than a minor proportion of the organic oxygenated compounds produced; further condensing the residual vaporous reaction product; and separating a second liquid water fraction relatively rich in organic oxygenated compounds.

7. In a process for producing normally liquid products predominating in hydrocarbons and containing organic oxygenated compounds by catalytically hydrogenating carbon monoxide in the presence of an alkali-promoted iron catalyst, the improvement which comprises cooling vaporous reaction product from said hydrogenation and condensing therefrom a two-phase liquid fraction at an elevated temperature above about 185° F., stratifying the resulting condensate, and withdrawing from said condensate at an elevated temperature above about 185° F. an aqueous phase containing not more than a minor proportion of the organic oxygenated compounds produced.

PHILIP C. WHITE.

REFERENCES CITED

The following references are of record in the file of this patent:

UNITED STATES PATENTS

| Number | Name | Date |
| --- | --- | --- |
| 1,587,188 | Schneible | June 1, 1926 |
| 1,979,841 | Pier | Nov. 6, 1934 |
| 2,215,472 | King | Sept. 24, 1940 |

FOREIGN PATENTS

| Number | Country | Date |
| --- | --- | --- |
| 17,338 | Great Britain | Nov. 28, 1888 |